United States Patent
Shar et al.

(10) Patent No.: US 7,546,420 B1
(45) Date of Patent: Jun. 9, 2009

(54) EFFICIENT TRACE CACHE MANAGEMENT DURING SELF-MODIFYING CODE PROCESSING

(75) Inventors: Leonard Eric Shar, Menlo Park, CA (US); Kevin Paul Lawton, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 316 days.

(21) Appl. No.: 11/535,971

(22) Filed: Sep. 27, 2006

Related U.S. Application Data

(60) Provisional application No. 60/721,385, filed on Sep. 28, 2005.

(51) Int. Cl.
*G06F 13/00* (2006.01)
(52) U.S. Cl. .................. 711/133; 711/144; 711/159
(58) Field of Classification Search .............. 711/133, 711/144, 159
See application file for complete search history.

(56) References Cited

U.S. PATENT DOCUMENTS

| | | | |
|---|---|---|---|
| 4,912,707 A | 3/1990 | Kogge et al. | |
| 5,381,533 A | 1/1995 | Peleg et al. | |
| 5,568,380 A | 10/1996 | Brodnax et al. | |
| 5,632,023 A | 5/1997 | White et al. | |
| 5,649,136 A | 7/1997 | Shen et al. | |
| 6,018,786 A | 1/2000 | Krick et al. | |
| 6,031,992 A | 2/2000 | Cmelik et al. | |
| 6,185,675 B1 | 2/2001 | Kranich et al. | |
| 6,449,714 B1 * | 9/2002 | Sinharoy | 712/240 |
| 6,604,060 B1 * | 8/2003 | Ryan et al. | 702/186 |
| 2006/0179346 A1 | 8/2006 | Bishop et al. | |

OTHER PUBLICATIONS

Almog, Y. et al., Specialized Dynamic Optimizations for High-Performance Energy-Efficient Microarchitecture, Proceedings of the International Symposium on Code Generation and Optimization, 2004 (12 pages).

Chaparro, P. et al., Distributing the Fronted for Temperature Reduction, Proceedings of the 11th Symposium on High-Performance Computer Architecture, Feb. 12-16, 2005 (10 pages).

Colwell, R. P. et al., A VLIW Architecture for a Trace Scheduling Compiler, 1987, pp. 180-192 (13 pages).

(Continued)

*Primary Examiner*—Reba I Elmore
(74) *Attorney, Agent, or Firm*—Osha • Liang LLP

(57) ABSTRACT

Efficient trace cache management during self-modifying code processing enables selective invalidation of entries of the trace cache, advantageously retaining some of the entries in the trace cache even during self-modifying code events. Instructions underlying trace cache entries are monitored for modification in groups, enabling advantageously reduced hardware. One or more translation ages are associated with each trace cache entry, and are determined when the entry is built by sampling current ages of memory blocks underlying the entry. When the entry is accessed and micro-operations therein are processed, the translation ages of the accessed entry are compared with the current ages of the memory blocks underlying the accessed entry. If any of the age comparisons fail, then the micro-operations are aborted and the entry is invalidated. When any portion of a memory block is modified, the current age of the modified memory block is incremented.

26 Claims, 9 Drawing Sheets

OTHER PUBLICATIONS

Fisher, J. A., Trace Scheduling: A Technique for Global Microcode Compaction, IEEE Transactions on Computers, vol. C-30, No. 7, Jul. 1981, pp. 478-490 (13 pages).

Friendly, D. et al, Putting the Fill Unit to Work: Dynamic Optimization for Trace Cache Microprocessors, Proceedings of the 31st Annual ACM/IEEE International Symposium on Microarchitecture, Nov. 30-Dec. 2, 1998, pp. 173-181 (9 pages).

Grunwald, D. and Ghiasi, S., Microarchitectural Denial of Service: Insuring Microarchitectural Fairness, Proceedings of the 35th Annual IEEE/ACM International Symposium on Microarchitecture, Nov. 18-22, 2002 (10 pages).

Hinton, G., The Microarchitecture of the Pentium 4 Processor, Intel Technology Journal Q1, 2001 (12 pages).

IBM Technical Disclosure Bulletin, Grouping of Instructions, v. 38, n. 8, Aug. 1, 1995, pp. 531-534 (4 pages).

Katevenis, E. G., Reduced Instruction Set Computer Architectures for VLSI, Berkley, California 1983, pp. 67-68 and 190 (7 pages).

Rotenberg, E., Bennett, S., and Smith, J. E., Trace Cache: a Low Latency Approach to High Bandwidth Instruction Fetching, In Proceedings of the 29th Annual International Symposium on Microarchitecture, Dec. 2-4, 1996, Paris, France (11 pages).

Slechta, B. et al, Dynamic Optimization of Micro-Operations, Proceedings of The 9th International Symposium on High-Performance Computer Architecture, Feb. 8-12, 2003 (12 pages).

Smith, J. E. and Pleszkun, A. R., Implementation of Precise Interrupts in Pipelined Processors, Proc. Computer Architecture, May 1985 (15 pages).

Tremblay, M., High-Performance Fault-Tolerant VLSI Systems Using Micro Rollback, Los Angeles, California, Sep. 1991, pp. 72-74, 81, 89-90, 102-104 and 246 (14 pages).

Vijaykumar, T. N., et al., Speculative Versioning Cache, IEEE Transaction on Parallel and Distributed Systems, vol. 12, No. 12, Dec. 2001, pp. 1305-1317 (13 pages).

\* cited by examiner

Current Age Table 115C

CATE 301C

| Current Age 310C | IgnoreWrite 311C | UseCount 312C | PhyTag 320.3 | V 321.3 | Other PhyTags Vs | PhyTag 320.0 | V 321.0 |

Other CATEs

CATE 302C

Fig. 3C

EFFICIENT TRACE CACHE MANAGEMENT DURING SELF-MODIFYING CODE PROCESSING

CROSS REFERENCE TO RELATED APPLICATIONS

Priority benefit claims for this application are made in the accompanying Application Data Sheet (if any). To the extent permitted by the type of the instant application, this application incorporates by reference for all purposes the following application(s), which are all owned by the owner of the instant application:

U.S. Provisional Application Ser. No. 60/721,385, filed Sep. 28, 2005, first named inventor Leonard Shar, and entitled EFFICIENT TRACE CACHE MANAGEMENT DURING SELF-MODIFYING CODE PROCESSING.

This application is related to the following application(s):

U.S. Non-Provisional application Ser. No. 11/535,972, filed Sep. 27, 2006, first named inventor Leonard Shar, and entitled SELECTIVE TRACE CACHE INVALIDATION FOR SELF-MODIFYING CODE VIA MEMORY AGING; and U.S. Non-Provisional application Ser. No. 11/535,977, filed Sep. 27, 2006, first named inventor Leonard Shar, and entitled TRACE CACHE FOR EFFICIENT SELF-MODIFYING CODE PROCESSING.

BACKGROUND

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

A processor (such as a microprocessor) processes instructions according to an instruction set architecture. The processing comprises fetching, decoding, and executing the instructions. Some instruction set architectures (such as the X86 architecture) comprise complex instructions. Some microprocessor implementations comprise translation hardware to convert the instructions (including complex instructions) into sequences of one or more relatively simpler operations referred to as micro-operations.

The processor may process a single instruction at a time, or the processor may process many instructions at a time in parallel. The processor may process instructions without overlap of processing of other instructions, or the processor may process instructions with some or a substantial overlap with each other via techniques such as pipelined processing. The processor may process instructions in-order, that is process a first instruction of a program before processing a second instruction of the program, or the processor may process instructions out-of-order. The processor may process instructions speculatively, that is start processing an instruction without certain knowledge that the instruction should be processed. If it is determined that the speculatively processed instruction should not be processed, then results of the speculatively processed instruction are discarded. The processor may process instructions without speculation.

In some instruction set architectures, instructions are characterized as being either sequential or non-sequential, i.e. specifying a change in control flow (such as a branch). Processing after a sequential instruction implicitly continues with a next instruction that is contiguous with the sequential instruction, while processing after a change in control flow instruction may optionally occur with either the contiguous next instruction or with another next instruction (frequently non-contiguous) as specified by the control flow instruction.

A special case of speculative processing comprises speculatively assuming a control flow change (due, for example, to a control flow instruction) and beginning processing of instructions at a non-contiguous location, before the control flow change is known to be certain to occur. If the change is found not to occur, then speculatively processed instruction results are discarded.

Some processors combine various combinations of parallel, pipelined, out-of-order, and speculative processing to improve performance. Some processors save results of translating instructions to micro-operations in a structure such as a trace cache.

Some instruction set architectures provide for a program to modify itself, by processing a memory write instruction that stores to an address that one or more instructions of the program reside in. Programs that modify themselves are referred to as having self-modifying code. If the modified instructions have been translated and saved as micro-operations in a trace cache prior to the processing of the memory write instruction, then the saved micro-operations are potentially at least partially incorrect (i.e. stale), and processing of the saved micro-operations will result in incorrect behavior.

Some processors or processor systems provide for agents other than one processor to modify a program the one processor is processing or has partially processed. For example, in some systems an external input/output device, via a direct memory access interface, is enabled to modify the program. For another example, in some multi-processor processor systems, another processor is enabled to modify the program. In some processor systems, modifications via a direct memory access interface and modifications via another processor are treated similarly to self-modifying code events.

Some processors recognize self-modifying code events and in response invalidate potentially stale saved micro-operations. In some systems the micro-operation invalidation is conservative, i.e. it is proper to invalidate trace cache information corresponding to more than what is actually modified, as long as at least the information corresponding to what is actually modified is invalidated. In some processors hardware is reduced by invalidating relatively more conservatively. For example, hardware is reduced by assuming a respective write modifies more locations in memory than the respective write actually modifies, and invalidating trace cache information accordingly (such as invalidating the entire trace cache, or a substantial portion thereof). When trace cache information is invalidated, subsequent processing of instructions (such as instructions corresponding to the invalidated information) is relatively less efficient, as new translations are required. For example, invalidating all trace cache information removes all saved translations, and subsequent instruction processing requires new translations to be made.

Further background information regarding trace caches may be found in:

Rotenberg, E., Bennett, S., and Smith, J. E. 1996, "Trace Cache: A Low Latency Approach To High Bandwidth Instruction Fetching", In Proceedings of the 29th Annual ACM/IEEE international Symposium on Microarchitecture (Paris, France, Dec. 2-04, 1996).

International Symposium on Microarchitecture. IEEE Computer Society, Washington, D.C., 24-35; and G. Hinton, D. Sager, M. Upton, D. Boggs, D. Carmean, A. Kyker, and P. Roussel. "The Microarchitecture Of The Pentium 4 Processor", Intel Technology Journal Q1, 2001.

SUMMARY OF THE INVENTION

The invention, in response to relatively less efficient processing of instructions due to relatively more conservative trace cache invalidation, and without substantially more hardware, provides efficient trace cache management during self-modifying code processing. In some embodiments, a system comprises a processor core enabled to execute micro-operations; a trace cache enabled to hold trace cache entries, each comprising one or more sampled ages and one or more micro-operations; and a control element. In some embodiments the control element is enabled to formulate one of the trace cache entries to correspond with one or more instructions, wherein each instruction corresponds to one or more memory blocks and each memory block has a current age; determine the current ages of the memory blocks that correspond with a particular trace cache entry; compare the sampled ages of the particular trace cache entry with the determined current ages; and selectively invalidate the particular trace cache entry based on a result of the compare.

In some embodiments, a method comprises creating an entry in a trace cache based at least in part on one or more of a plurality of memory blocks; associated with the creating, sampling one or more current ages of a plurality of current ages; managing a correspondence between each of the current ages and a respective one of the memory blocks; detecting a modification to any one of the one or more memory blocks; and subsequent to the detecting, selectively invalidating the entry.

In some embodiments, a system comprises means for creating an entry in a trace cache based at least in part on a translation of one or more instructions obtained from one or more of a plurality of memory blocks; means for sampling current ages of the one or more memory blocks in coordination with the means for creating; and means for selectively invalidating the entry after speculatively executing at least a portion of results of the translation if any portion of the one more memory blocks has been modified after creation of the entry and before the speculatively executing.

The invention is optionally embodied in numerous embodiments, including but not limited to one or more of a process, an article of manufacture, an apparatus, a system, a composition of matter, and a computer readable medium such as a computer readable storage medium or a computer network wherein any combination of program instructions, interpretable parameters, and hardware descriptions are sent over optical or electronic communication links. The order of some operations of disclosed processes is alterable within the scope of the invention. The Detailed Description provides an exposition of one or more embodiments of the invention and includes an Introduction to facilitate more rapid understanding of the remainder of the Detailed Description. As is described in more detail in the Conclusion section, the invention encompasses all possible modifications and variations within the scope of the issued claims

DESCRIPTION OF THE FIGURES

FIG. 3C illustrates selected details of a "region table" embodiment of the Current Age Table of FIG. 1 in accordance with one embodiment of the present invention.

DETAILED DESCRIPTION OF EMBODIMENTS OF THE INVENTION

Figure 1:
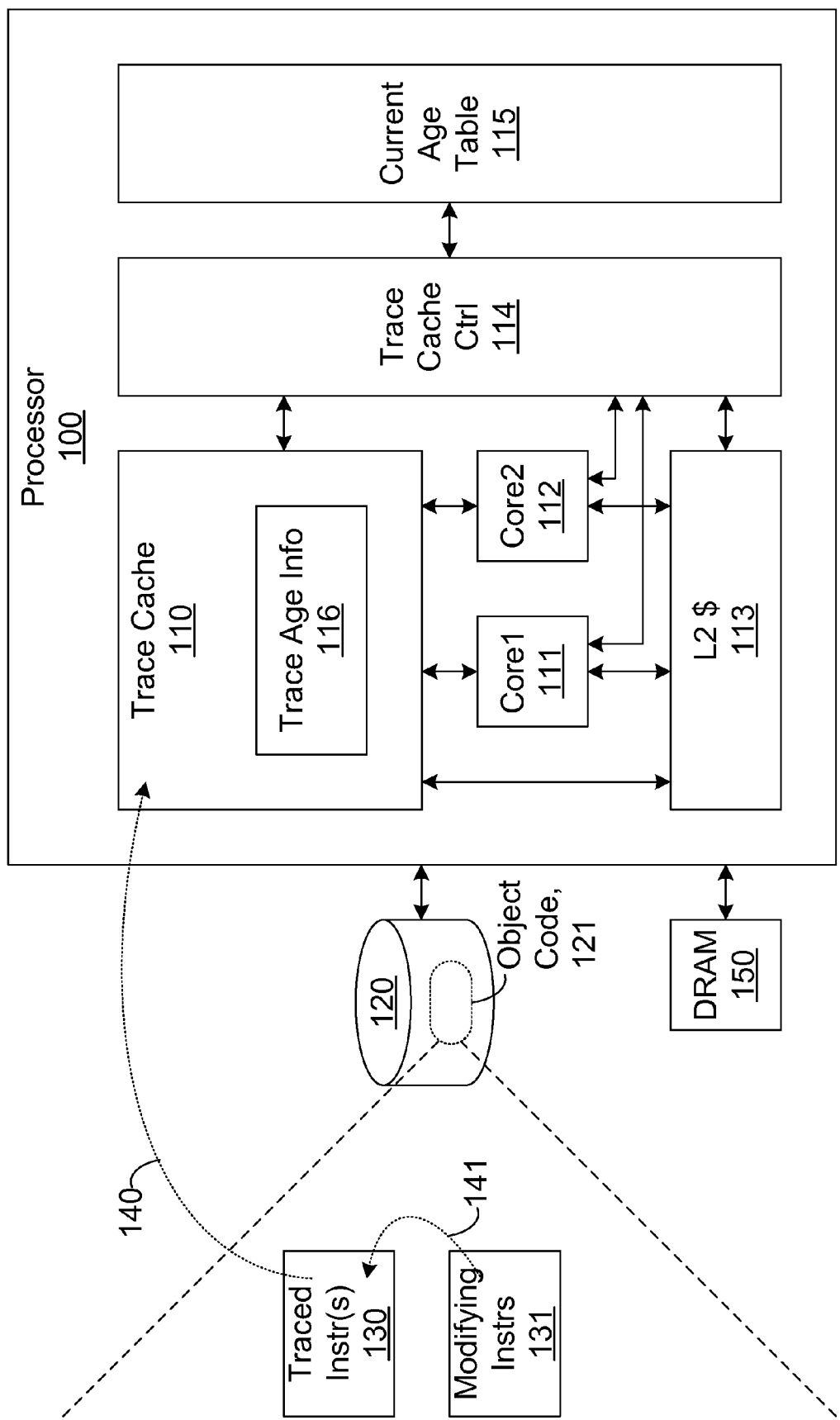
FIG. 1 illustrates selected details of a processor system having a trace cache enabling efficient trace cache management during self-modifying code processing in accordance with one embodiment of the present invention.

A detailed description of one or more embodiments of the invention is provided below along with accompanying figures illustrating selected details of the invention. The invention is described in connection with the embodiments. It is well established that it is neither necessary, practical, or possible to exhaustively describe every embodiment of the invention. Thus the embodiments herein are understood to be merely exemplary, the invention is expressly not limited to or by any or all of the embodiments herein, and the invention encompasses numerous alternatives, modifications and equivalents. To avoid monotony in the exposition, a variety of word labels (including but not limited to: first, last, certain, various, and some) may be applied to separate sets of embodiments; as used herein such labels are expressly not meant to convey quality, or any form of preference or prejudice, but merely to conveniently distinguish among the separate sets. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts described in the introduction, as the paragraphs of any introduction are necessarily an abridged view of the entire subject and are not meant to be an exhaustive or restrictive description. For example, the introduction that follows provides overview information limited by space and organization to only some embodiments. There are in fact many other embodiments, including those to which claims will ultimately be drawn, that are described throughout the balance of the specification.

Acronyms

Elsewhere herein various shorthand abbreviations, or acronyms, are used to refer to certain elements. Descriptions of some of the acronyms follow.

| Acronym | Description |
| --- | --- |
| CAM | Content Addressable Memory |
| CATE | Current Age Table Entry |
| DRAM | Dynamic Random Access read/write Memory |
| EIP | Extended Instruction Pointer |
| TCE | Trace Cache Entry |
| TLB | Translation Look-aside Buffer |

Terms

Elsewhere herein various terms are used with respect to descriptions of embodiments. Examples of some of the terms follow.

An example of a cache line physical address is a physical address of the first byte of a cache line in accordance with a processor memory space. An example of a page physical address is a physical address of the first byte of a page in accordance with a processor memory space. An example of a region physical address is a physical address of the first byte of a region of a processor memory space. In some embodiments a region physical address is equivalent to a cache line physical address, and in some embodiments a region physical address is equivalent to a page physical address. An example of a processor memory space is a range of memory locations addressable by a processor.

An example of a memory block is a fixed size contiguous portion of memory, suitable for monitoring for modification, such as by a processor memory write or a device write. According to various embodiments, the memory block is a half of a cache line, an entire cache line, a half of a page, or a full page, or any suitable size.

An example of building a TCE comprises analyzing instructions from one or more memory blocks to determine an appropriate set of one or more corresponding micro-operations that when processed effect memory and machine state changes specified by the analyzed instructions. The analyzing and determining is collectively referred to as translating; e.g. a TCE comprises micro-operations produced by translating instructions from memory blocks underlying the TCE. An example of creating a TCE comprises building a new TCE without benefit of an existing TCE. An example of updating a TCE comprises building an updated TCE from an existing TCE, such that the updated TCE comprises at least some micro-operations from the existing TCE.

Overview

Recognizing and responding to self-modifying code events in a processor having a trace cache is improved in a processor enabled for efficient trace cache management during self-modifying code processing. Saved micro-operations in the trace cache are invalidated conservatively, but selectively, so that under some usage scenarios, substantial information is advantageously retained in the trace cache even after processing a self-modifying code event. Thus under some usage scenarios some translations are available after the self-modifying code event and used for improved efficiency compared to other techniques where no translations (or relatively fewer) remain after the event. The efficient trace cache management during self-modifying code processing performs invalidations conservatively, however, as a plurality of instructions are monitored together, and thus relatively less hardware is needed than for relatively less conservative techniques that individually monitor instructions for modification.

The efficient trace cache management advantageously enables TCEs to be created from instructions from a plurality of non-contiguous memory blocks. The efficient trace cache management advantageously enables a plurality of TCEs to be created from instructions from one or more memory blocks in common; i.e. the one or more common memory blocks are underlying a plurality of TCEs.

Various embodiments enable efficient trace cache management during self-modifying code processing. When any portion of a memory block is modified a current age associated with the memory block is incremented. When a TCE is created, the current ages associated with each of the memory blocks underlying the TCE are associated with the TCE as respective translation ages of the TCE. When micro-operations from a TCE are processed, each of the translation ages of the TCE are checked against the corresponding current ages of the respective memory blocks underlying the TCE. If there have been no modifications to the memory blocks underlying the TCE, then the current ages will match the translation ages. However, if there have been any modifications to the memory blocks underlying the TCE, then one or more of the current ages will not match the corresponding current ages. If any one of the current ages does not match the corresponding current age, then the TCE is invalidated, the micro-operations of the TCE discarded or aborted, and new translations (e.g. corresponding to the modified memory blocks) are created.

Thus in some embodiments modifications to memory are detected without a CAM operation or a special look up in the trace cache. If one memory block underlies a plurality of TCEs (i.e. the plurality of TCEs are built at least from one or more instructions from the one memory block), then all of the plurality of TCEs become stale when the one memory block is modified. The TCEs become stale even if other memory blocks underlying some of the TCEs remain unmodified. However, the micro-operations in the stale TCEs are not processed to completion, since the translation age comparing detects a difference between the translation age of the (stale) TCE corresponding to the modified memory block and the current age corresponding to the modified memory block, and in response the micro-operations are discarded or aborted, and the TCE is invalidated.

Translation ages and current ages are constrained to finite ranges. Therefore there is a maximum current age of memory blocks and a corresponding maximum translation age of TCEs (or portions thereof). If incrementing a memory block current age would result in the current age wrapping around to zero (or overflowing), then the entire trace cache is flushed (i.e. all TCEs are invalidated) and all of the memory block current ages are reset to zero. Alternatively, if any current age is incremented to the maximum current age (or further alternatively incremented when already equal to the maximum current age), then the entire trace cache is flushed and all of the memory block current ages are reset to zero. Various embodiments provide for various techniques to reduce flushes of the trace cache due to memory block current age increment exhaustion.

Various embodiments of a processor system having a processor comprising a trace cache and enabled to efficiently process self-modifying code provide for one or more respective groups of translation ages associated with each entry in the trace cache. Each group of translation ages associated with a TCE comprises a respective translation age for each memory block from which instructions were translated when building the TCE, and the respective memory blocks are described as underlying the TCE. Each translation age represents a respective current age of the respective memory block sampled when the TCE was built. In some embodiments the translation ages are comprised in trace age information comprised in the trace cache, for example as a collection of trace age fields, each field being associated with or comprised in a TCE, and for another example as translation age checking micro-operations embedded in a TCE. In some embodiments the translation age checking micro-operations are a form of assertion-checking micro-operations.

In some embodiments when micro-operations in a TCE are processed, translation age information associated with the TCE is compared with corresponding current ages of the underlying memory blocks. If any of the translation ages differ from the respective corresponding current age, then results of the micro-operations are discarded and the TCE is invalidated. When any portion of a memory block is modified (by a processor write or a direct memory access write, for example), the current age of the memory block is incremented. If incrementing would result in overflow of a current age, then the entire trace cache is flushed and all current age values are reset to a starting value.

In some embodiments, comparing of TCE translation ages with memory block current ages is according to a pre-determined number of translation age properties pre-allocated in association with each TCE or in each TCE. In some embodiments, the comparing of TCE translation ages with memory block current ages is according to a variable number of translation age checking micro-operations embedded in-line in a TCE, the variable number being in accordance with the number of memory blocks underlying the TCE.

In some embodiments, comparing of TCE translation ages with memory block current ages is in series with processing of micro-operations of a TCE. In some embodiments, comparing of TCE translation ages with memory block current ages is at least partially in parallel with processing of micro-operations of a TCE.

In some embodiments, the processor system comprises a microprocessor, DRAM, and non-volatile storage. In some embodiments, the processor system comprises a multi-core processor where multiple processor cores share a single trace cache. In some embodiments, the processor system comprises a multi-core processor where multiple processor cores share a single Level 2 cache.

In some embodiments, TCEs are limited to a basic block, e.g. a stream of contiguous sequential instructions terminated by a non-sequential instruction. In some embodiments, TCEs span a plurality of basic blocks. In some embodiments, the trace cache comprises a basic block trace cache having entries managed with respect to self-modifying code events as described elsewhere herein with respect to TCEs. In some embodiments, the trace cache comprises a multi-block trace cache having entries managed with respect to self-modifying code events as described elsewhere herein with respect to TCEs.

In some embodiments, a current age table tracks current ages of memory blocks for sampling when building TCEs. In some embodiments, the current age table is reduced to cover only memory blocks that are usable to build translations in the trace cache table; in other words the current age table is not enabled to track current ages of memory blocks from which TCEs are not built (such as areas of non-cacheable memory). The current age of a memory block, as determined by the current age table, is sampled at the time a TCE is built, and the sampled value is associated with, stored into, or embedded in the TCE. In some embodiments, an optional ignore-write property is tracked for each memory block. In some embodiments, an optional use-count property is tracked for each memory block.

Various embodiments comprise an optional ignore-write property associated with each memory block to indicate whether any TCEs comprise micro-operations produced by translating instructions from the respective memory block. When an ignore-write property is set, writes to the associated memory block have no effect on the current age of the memory block. When an ignore-write property is clear, processing of a write to the associated memory block comprises setting the ignore-write property and incrementing the current age of the memory block. When an entry is created in the trace cache, the ignore-write properties corresponding to all of the memory blocks (at least partially) underlying the entry are cleared. When the trace cache is flushed, the ignore-write properties corresponding to all of the memory blocks are set. Selectively ignoring writes enables increased time between flushes of the trace cache due to an overflow of a memory block current age, in some usage scenarios, as memory block current ages are incremented less frequently, and thus advantageously overflow less frequently.

Various embodiments comprise an optional use-count property associated with each memory block to indicate (with saturation) how many TCEs comprise micro-operations produced by translating instructions from the respective memory block. When a TCE is created, the use-count property of each memory block underlying the TCE is incremented with saturation at a maximum value. When a TCE is invalidated, the use-count property of each memory block underlying the TCE is conditionally decremented. If the use-count property was not previously at the maximum value, then the conditional decrement results in the use-count property being decremented by one. If the use-count property was previously at the maximum value, then the conditional decrement has no effect; i.e. the use-count property remains at the maximum value. If the use-count property is decremented to zero, then the current age of the corresponding memory block is reset to zero. When the trace cache is flushed, all of the use-count properties corresponding to all of the memory blocks are reset to zero. Selectively resetting current ages of memory blocks to zero (such as when no TCEs exist that have been built from the memory blocks), in some usage scenarios, enables increased time between flushes of the trace cache due to an overflow of a memory block current age, and thus advantageously enables TCEs to remain in the trace cache longer.

In some embodiments, the current age table comprises a plurality of entries, each entry being associated with a respective memory block. In some embodiments, the current age of a respective memory block is embodied as a field in the respective CATE associated with the respective memory block. In some embodiments, the optional ignore-write property of a memory block is embodied as an optional ignore-write bit in the respective CATE associated with the respective memory block. In some embodiments, the optional usecount property is embodied as an optional use-count field in the respective CATE associated with the respective memory block.

In some embodiments, at least a portion of the current age table is embodied as an extension of a Level 2 cache. In some embodiments, at least a portion of the current age table is integrated with a Level 2 cache. In some embodiments, at least a portion of the current age table is comprised in logical data structures associated with a Level 2 cache. In some embodiments, at least a portion of the current age table is comprised in physical data structures associated with a Level 2 cache. In some embodiments, the current age table is separate from Level 1 and Level 2 caches. In some embodiments, where the current age table embodies ignore-write bits and use-count fields, the trace cache is managed to be a subset of the Level 2 cache; i.e. eviction of a line in the Level 2 cache results in invalidation of all TCEs having micro-operations translated from instructions from the evicted line.

In some embodiments, each ignore-write property is associated with a single memory block, while in other embodiments each ignore-write property is associated with a plurality of memory blocks, e.g. contiguous cache lines or ways of an associative cache. In some embodiments, each use-count property is associated with a single memory block, while in other embodiments each use-count property is associated with a plurality of memory blocks, e.g. contiguous cache lines or ways of an associative cache.

Processor System

FIG. 1 illustrates selected details of an embodiment of a processor system having a trace cache enabling efficient trace cache management during self-modifying code processing. Processor 100 comprises Trace Cache 110, Core1 111, Core2 112, Trace Cache Control 114, Current Age Table 115, and Level 2 Cache (L2$) 113. The Trace Cache comprises Trace Age Information 116, used in conjunction with Current Age Table 115 by Trace Cache Control 114 to enable selective recognition and removal of stale trace information in Trace Cache 110. Main memory for the Processor is implemented in part by DRAM 150. The DRAM is an example of mass storage accessible by the processor. Non-volatile Storage 120 is coupled to the Processor and stores Object Code Image 121. The Non-volatile storage is another example of mass storage accessible by the processor, and in various embodiments is provided by magnetic or optical media, memory chips enabled to retain information without application of power, and other suitable elements. The Object Code Image comprises representative code images Traced Instruction(s) 130 and Modifying Instructions 131.

According to various embodiments, the Trace Cache Control comprises hardware logic and circuit elements providing functions relating to management and use of any combination of the Trace Cache and the Current Age Table. For example, in some embodiments the Trace Cache Control comprises elements to build, create, update, access, and invalidate TCEs of the Trace Cache and information comprised therein. For another example, in some embodiments the Trace Cache Control comprises elements to create and update CATEs of the Current Age Table and information comprised therein. For yet another example, in some embodiments the Trace Cache Control interfaces to one or more of the Cores to collect information about micro-operations processed at least in part to determine if a TCE is stale. For yet another example, in some embodiments the Trace Cache Control interfaces to one or more of the Cores to direct micro-operations to selectively retire or abort, depending on staleness of a TCE. For yet another example, in some embodiments the Trace Cache Control interfaces to the Level 2 Cache and the Current Age Table at least in part to manage the Trace Cache contents as a subset of the Level 2 Cache contents.

In operation, portions of the Object Code Image are loaded into locations of the main memory of the Processor under control of an operating system, driver, or similar mechanism (e.g. by copying into the DRAM). Subsequently the Processor fetches, decodes, and executes instructions of the Object Code Image from the DRAM. In some embodiments, the fetching comprises storage of copy of a portion of the instructions of the Object Code Image in the Level 2 Cache. The decoding comprises translation of instructions into micro-operations, and at least some of the micro-operations are cached by building and saving one or more entries in the Trace Cache. The executing comprises processing of micro-operations (such as from the Trace Cache) by various combinations of the Cores.

For example, micro-operations corresponding to Traced Instruction(s) 130 are cached in the Trace Cache, as indicated conceptually by dashed-arrow 140, and executed in part by various combinations of Core1 111 and Core2 112. Subsequently additional instructions are fetched, decoded, and executed, such as Modifying Instructions 131. When executed, one or more of the instructions of the Modifying Instructions write one or more of the main memory locations Traced Instruction(s) 130 has been loaded into, resulting in a self-modifying code event. The self-modifying code event is indicated conceptually by dashed-arrow 141. After the self-modifying code event, it is possible that some of the micro-operations cached in the Trace Cache are stale, i.e. out-of-date with respect to the now modified instructions the micro-operations were translated from. The self-modifying code event is detected in association with processing the stale micro-operations, and partially in response the stale micro-operations in the Trace Cache are invalidated. The invalidation is conservative to ensure that no stale information is retained.

The invalidation is conservative but also selective. When entries in Trace Cache 110 are built, Trace Cache Control 114 consults Current Age Table 115 and a sampling of current age information is saved in the Trace Cache, e.g. in Trace Age Information 116. The Trace Age Information enables a selective, but still conservative, invalidation of entries in the Trace Cache when a self-modifying code event is detected.

Trace Cache

Figure 2:
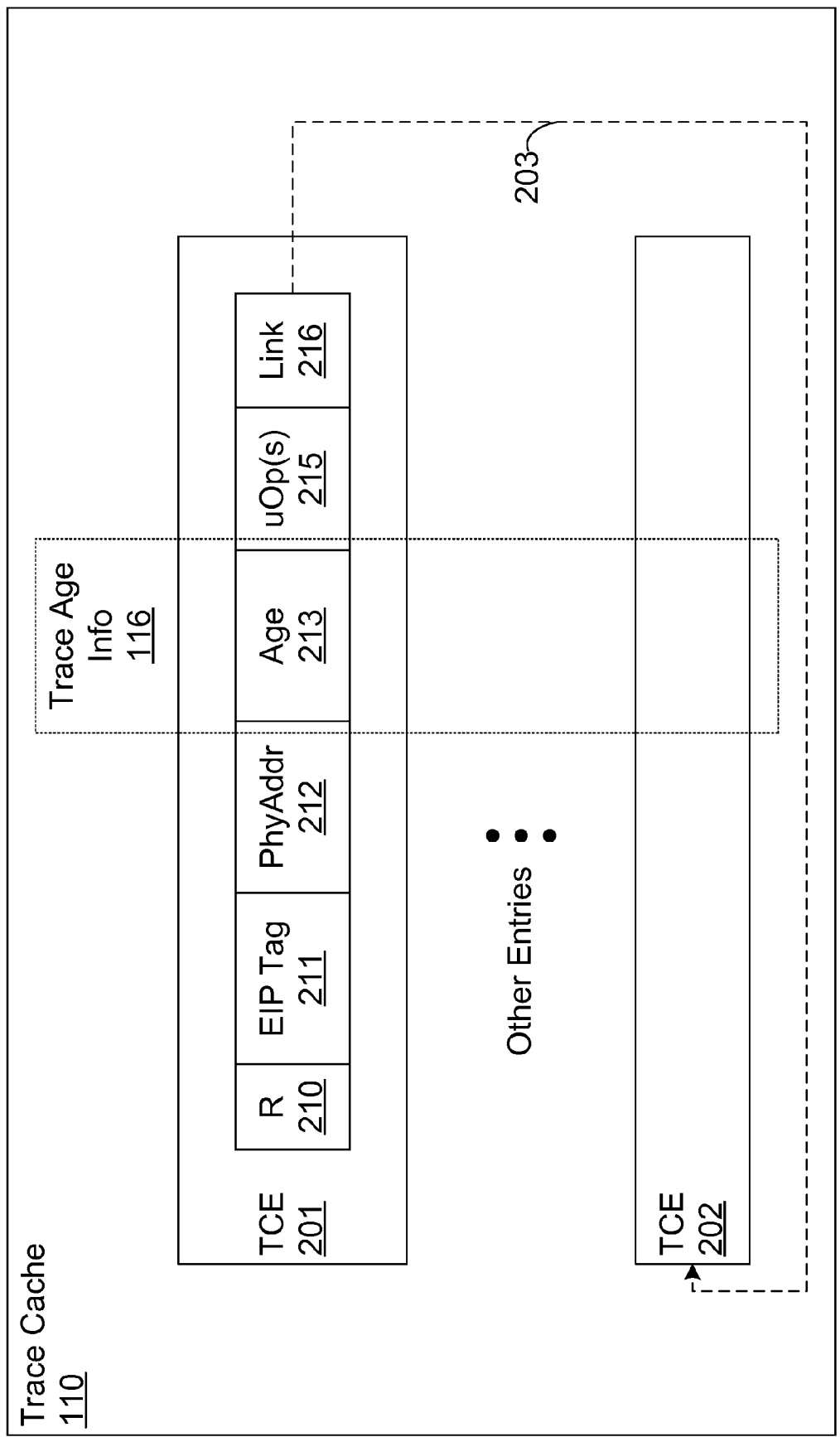
FIG. 2 illustrates selected details of the Trace Cache of FIG. 1 in accordance with one embodiment of the present invention.

FIG. 2 illustrates selected details of an embodiment of the Trace Cache of FIG. 1. Trace Cache 110 comprises a plurality of entries, represented conceptually by TCE 201 and TCE 202. Each entry comprises any combination of fields to enable saving, referencing, processing, and monitoring for staleness micro-operations produced during translation of instructions. Details of TCE 201 are shown while details of the other TCEs are identical to TCE 201 but omitted for clarity. According to various embodiments, the fields comprise any combination of:

one or more tags suitable for matching against an EIP (corresponding to the first of the instructions translated to produce the entry), illustrated conceptually as EIP Tag 211;

one or more at least partial physical addresses (relating to physical memory addresses of the instructions translated to produce the micro-operations of the entry), illustrated conceptually as PhyAddr 212;

one or more translation ages (determined by sampling current ages associated with memory addresses corresponding to the instructions translated to produce the entry), illustrated conceptually as Age 213;

one or more micro-operations (produced by the translation of the instructions underlying the entry), illustrated conceptually as uOps(s) 215; and one or more link pointers (optionally pointing to a one or more next entries in the trace cache to process subsequent to the instant entry), illustrated conceptually as Link 216.

Some embodiments have one or more optional Recentness Bits, illustrated conceptually as R 210. Some embodiments have additional fields in TCEs, such as a Head or a Tail indicator, or a remaining EIP indicator. The Age fields of all of the TCEs collectively comprise Trace Age Info 116.

Current Age Table

Figure 3A:
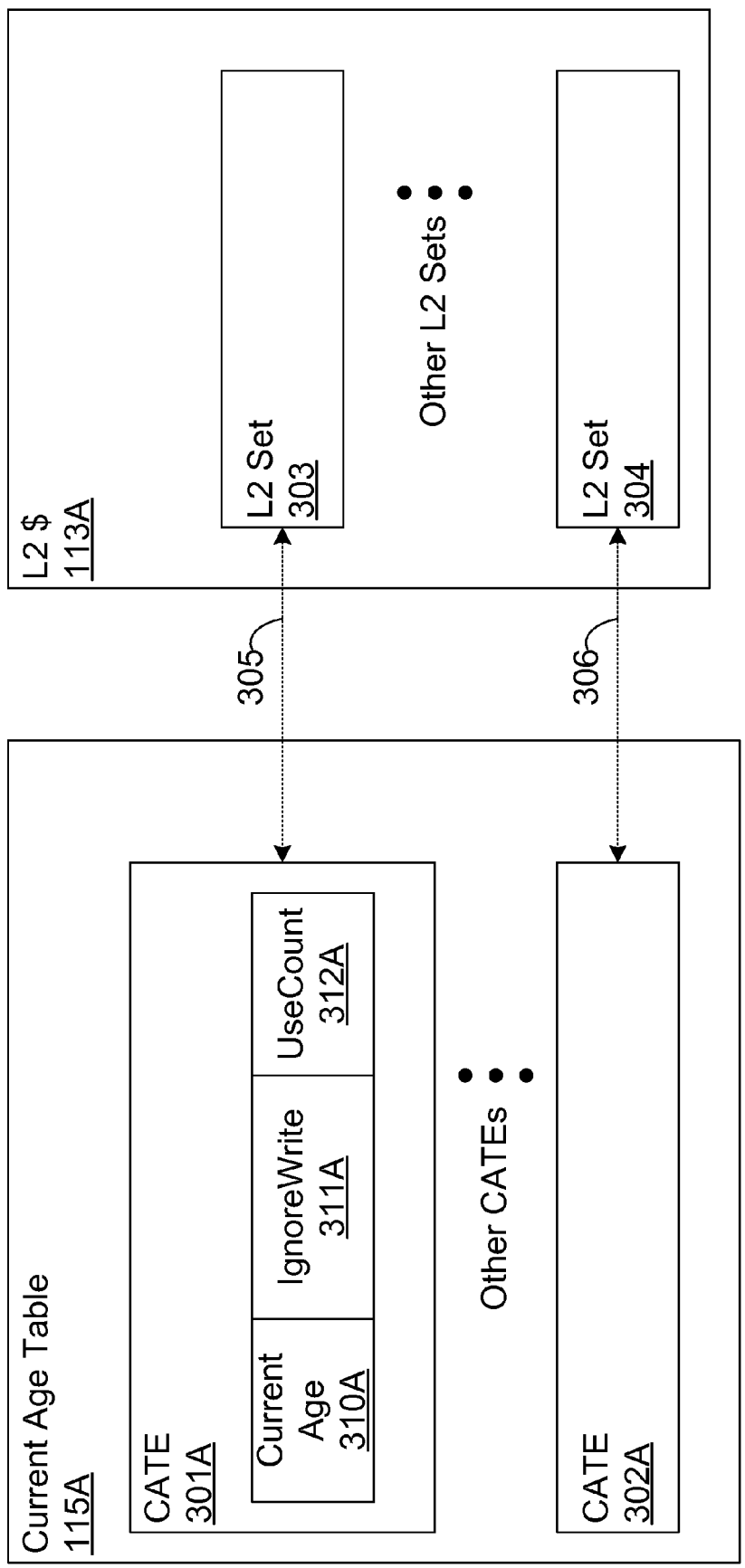
FIG. 3A illustrates selected details of a "per-set" embodiment of the Current Age Table of FIG. 1, in context with an embodiment of the Level 2 Cache of FIG. 1 in accordance with one embodiment of the present invention.

FIG. 3A illustrates selected details of a "per-set" embodiment of the Current Age Table of FIG. 1, in context with an embodiment of the Level 2 Cache of FIG. 1. Current Age Table 115A (an example embodiment of Current Age Table 115 of FIG. 1) comprises a plurality of entries, represented conceptually by CATE 301A and CATE 302A. Details of CATE 301A are shown while details of the other CATEs are identical to 301A but omitted for clarity. Each entry comprises a field to track a current age of a respective memory block, and in some embodiments one or more optional fields to reduce current age overflows. According to various embodiments, the fields comprise any combination of:

a current age, illustrated conceptually as Current Age 310A;

an optional bit to direct ignoring of writes with respect to incrementing current age, illustrated conceptually as Ignore Write 311A; and an optional field to indicate (with saturation) how many entries in the Trace Cache depend on the memory block associated with the entry, illustrated conceptually as Use-Count 312A.

Some embodiments have additional fields in CATEs.

L2$ 113A (an example embodiment of L2$ 113 of FIG. 1) is comprised of a plurality of identical sets, illustrated conceptually by L2 Set 303 and L2 Set 304. Each CATE has a one-to-one correspondence with a respective set in L2$ 113A, and hence the illustrated embodiment of the Current Age Table is referred to as a per-set embodiment. The correspondence is indicated conceptually by dashed-arrow 305 between CATE 301A and L2 Set 303, and dashed-arrow 306 between CATE 302A and L2 Set 304. In some embodiments, each CATE has a one-to-one correspondence with a row (comprising a plurality of lines) in the Level 2 cache.

Figure 3B:
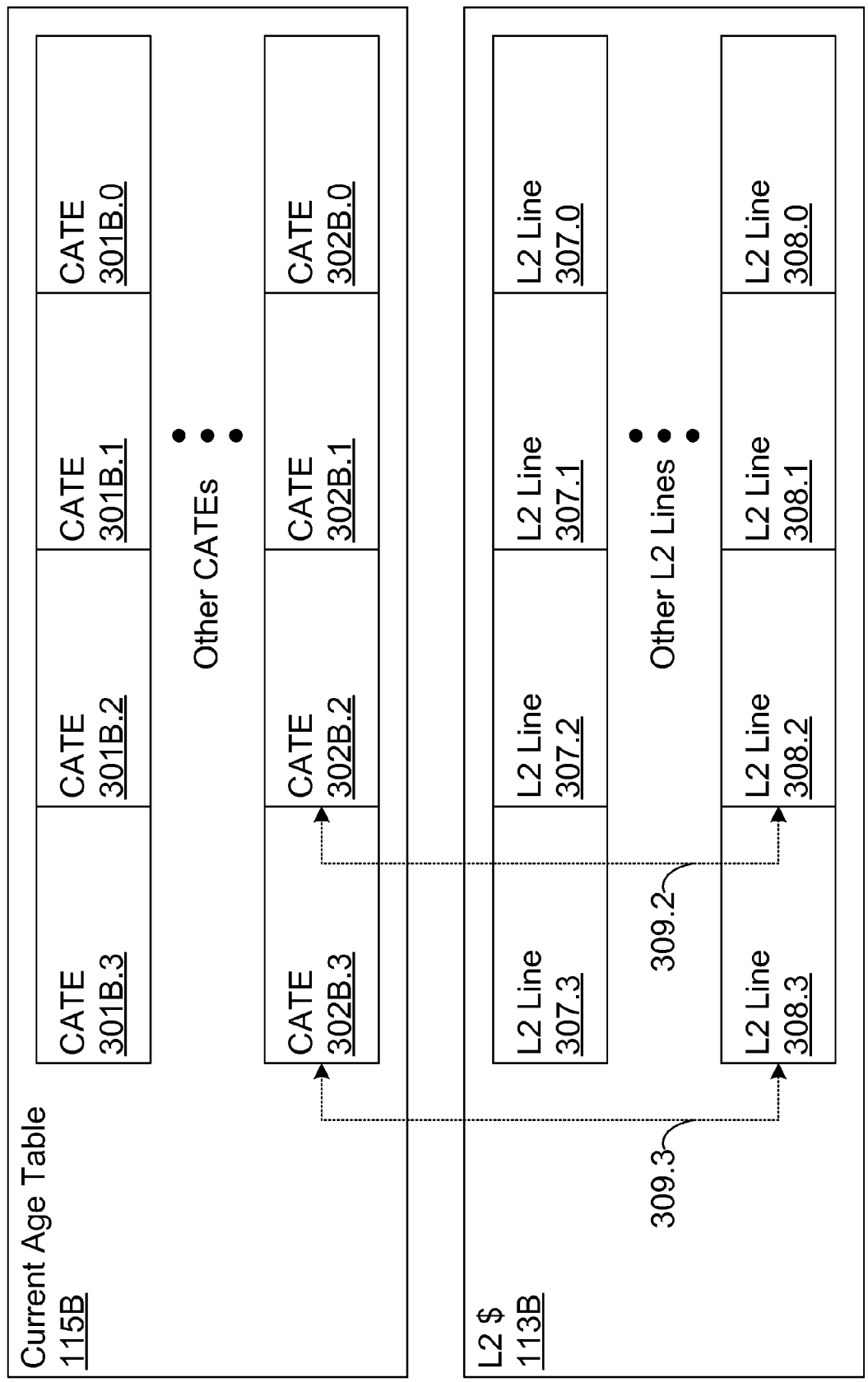
FIG. 3B illustrates selected details of a "per-way" embodiment of the Current Age Table of FIG. 1, in context with an embodiment of the Level 2 Cache of FIG. 1 in accordance with one embodiment of the present invention.

FIG. 3B illustrates selected details of a "per-way" embodiment of the Current Age Table of FIG. 1, in context with an embodiment of the Level 2 Cache of FIG. 1. Current Age Table 115B (an example embodiment of Current Age Table 115 of FIG. 1) comprises a plurality of entries illustrated conceptually by CATEs 301B.0-301B.3 and CATEs 302B.0-302B.3. Each CATE is similar to those illustrated in FIG. 3A, and comprise any combination of current age, write ignore, and use-count information, according to various embodiments. L2$ 113B (an example embodiment of L2$ 113 of FIG. 1) comprises a plurality of similar lines illustrated conceptually by L2 Lines 307.0-3 and L2 Lines 308.0-3.

CATE and L2 Line elements having identical element identifier suffixes are comprised in the same way. For example, CATE 301B.3, CATE 302B.3, L2 Line 307.3 and L2 Line 308.3, having suffix "0.3", are all part of way number three. Similarly, CATE 301B.0, CATE 302B.0, L2 Line 307.0 and L2 Line 308.0, having suffix "0.0", are all part of way number zero. Thus the CATE information is available separately for each way, and hence the illustrated embodiment of the Current Age Table is referred to as a per-way embodiment.

Each CATE has a one-to-one correspondence with a respective line in L2$ 113B, as indicated conceptually by dash-arrow 309.2 (showing a correspondence between CATE 302B.2 and L2 Line 308.2) and dashed-arrow 309.3 (showing a correspondence between CATE 302B.3 and L2 Line 308.3).

FIG. 3C illustrates selected details of a "region table" embodiment of the Current Age Table of FIG. 1. Current Age Table 115C (an example embodiment of Current Age Table 115 of FIG. 1) comprises a plurality of entries illustrated conceptually by CATE 301C and CATE 302C. Details of CATE 301C are shown while details of the other CATEs are identical to 301C but omitted for clarity. Each entry comprises any combination of fields similar in concept and operation to those of the CATEs of FIG. 3A. Current Age 310C is similar to Current Age 310A, optional Ignore Write 311C is similar to Ignore Write 311A, and optional Use-Count 312C is similar to Use-Count 312A. Each entry further comprises one or more physical address tags and one or more respective validity indicators associated with each physical address tag, illustrated conceptually by physical address tag PhyTag 320.3 with associated validity indicator V 321.3 and physical address tag PhyTag 320.0 with associated validity indicator V 321.0. The CATE information is available according to regions of memory in accordance with the PhyTags and hence the illustrated embodiment of the Current Array Table is referred to as a region table embodiment.

In some region table embodiments of a current age table, the table is sufficiently large to simultaneously cover all memory blocks in a system. In some region table embodiments, the table is reduced to simultaneously cover all memory blocks from which it is possible to build TCEs (e.g. non-cacheable memory is not tracked by the table). In some region table embodiments, a hash function is used to map physical memory addresses for matching against a tag (such as one of the PhyTags). In some of the embodiments using a hash function the table is reduced to simultaneously cover a subset of memory blocks from which it is possible to build TCEs, and a TCE is optionally invalidated when underlying memory blocks are no longer covered by the table. In some embodiment the table is in accordance with a multi-way associative organization, with one physical address tag per way. For example in a 4-way associative organization, PhyTag 320.3 corresponds to way three and PhyTag 320.0 corresponds to way zero.

Age Comparison Flow

Figure 4:
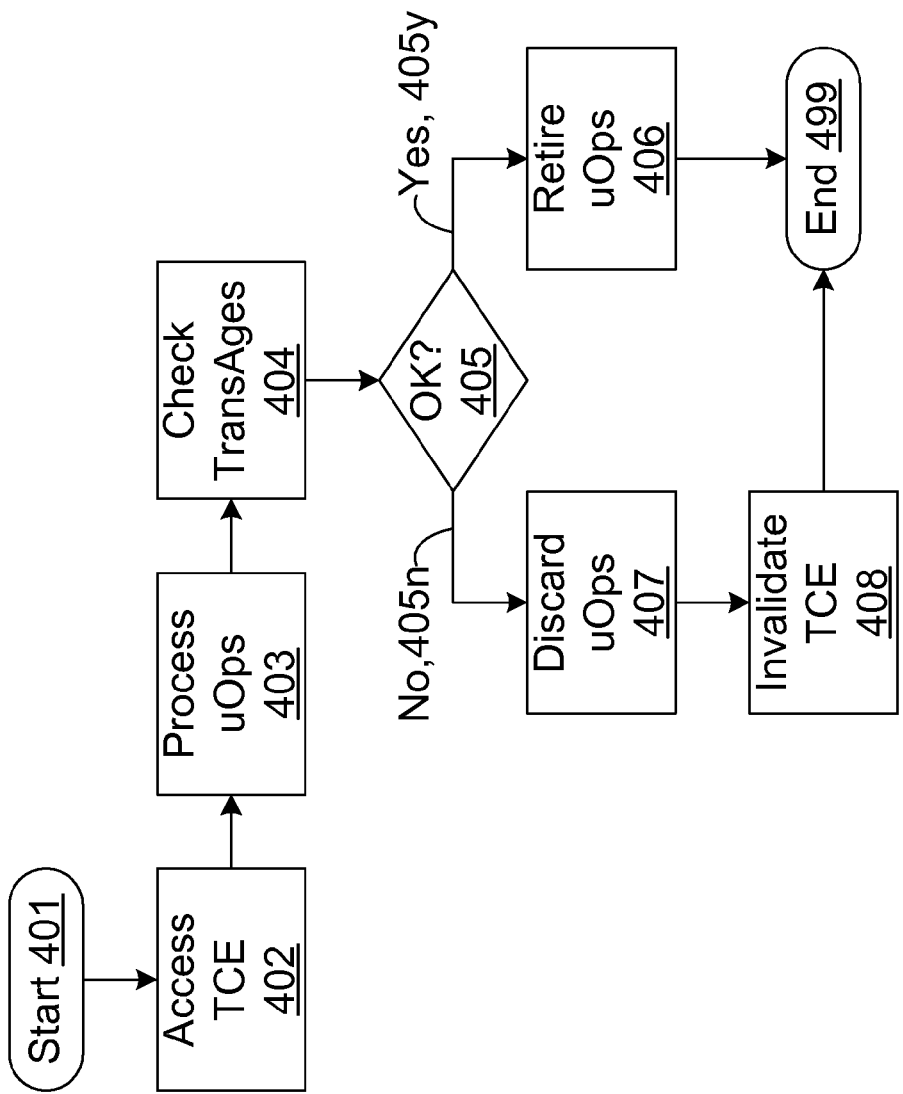
FIG. 4 illustrates selected details of checking trace cache entry translation ages against underlying memory block current age information in accordance with one embodiment of the present invention.

FIG. 4 illustrates selected details of an embodiment of checking TCE translation ages against underlying memory block current age information. Flow begins ("Start" 401) when referencing a trace cache is to result in accessing a TCE of the trace cache for processing. Flow continues to access the TCE ("Access TCE" 402) and then to process the micro-operations provided by the TCE ("Process uOps" 403). Flow then proceeds to compare translation ages associated with the TCE with current ages associated with the memory blocks underlying the TCE ("Compare Translation Ages" 404). For example, if the TCE has been built from a single memory block, then information associated with the TCE is used to access the current age associated with the single memory block. The current age is then compared against the single translation age associated with the entry. For another example, if the TCE has been built from a plurality of memory blocks, then information associated with the TCE is used to access respective current ages associated with each of the respective memory blocks. Each current age is then compared against the corresponding respective translation age.

The comparison results are checked ("OK?" 405), and if any of the current age versus translation age comparisons fail, then the age comparison is not okay ("No" 405n), and flow proceeds to discard the micro-operations provided by the TCE ("Discard uOps" 407) and then to invalidate the TCE ("Invalidate TCE" 408) as the TCE has been determined to be stale. Processing is then finished ("End" 499). If all of the current age versus translation age comparisons pass, then the age comparison is okay ("Yes" 405y), and flow proceeds to allow the micro-operations provided by the TCE to complete ("Retire uOps" 406). Processing is then finished ("End" 499). Note that in some usage scenarios other events prevent the micro-operations from completing (such as an exception determined during processing of one of the micro-operations).

Processing associated with "Compare Translation Ages" 404 varies according to embodiment. In some embodiments, a pre-determined fixed number of translation ages (e.g. one or more instances of Age 213 of FIG. 2) are associated or stored with each TCE, and for each translation age a memory block identifier (e.g. one or more instance of PhyAddr 212 of FIG. 2) is associated or stored with the respective translation age. For each translation age of a TCE, the associated respective memory block identifier is used to determine a respective memory block current age via a look up in a memory block current age table (e.g. from Current Age Table 115 using PhyAddr 212 as a look up key). The respective memory block current age is then compared against the respective translation age, and if any of the comparisons determine a difference, then "Compare Translation Ages" 404 is deemed to have failed, as at least a portion of the TCE is potentially stale.

In some embodiments, comparisons associated with "Compare Translation Ages" 404 are performed in series with processing micro-operations of the TCE associated with the comparisons. In some embodiments, the comparisons are performed at least partially in parallel with processing the micro-operations of the TCE.

In some embodiments, comparisons associated with "Compare Translation Ages" 404 are performed with hardware resources at least partially distinct from hardware resources substantially dedicated to processing micro-operations. In some embodiments, the comparisons are performed with hardware resources at least partially shared with processing micro-operations.

In some embodiments, comparisons associated with "Compare Translation Ages" 404 are performed via one or more Check Age micro-operations embedded in the micro-operations of a TCE. In some embodiments, there is an embedded Check Age micro-operation in a TCE for each memory block underlying the TCE. In some embodiments, Check Age micro-operations are scheduled and subject to optimized processing in accordance with other micro-operations.

In some embodiments a variable number of Check Age micro-operations are possible in a TCE, up to a maximum micro-operation storage capacity of the TCE, thus advantageously enabling building TCEs with a variable number of underlying memory blocks. In some embodiments, no TCE storage is specifically dedicated to memory block identifiers, and instead a variable number of memory block identifiers are embedded as arguments to a respective variable number of embedded Check Age micro-operations, advantageously freeing up TCE storage space for other uses. In some embodiments, no TCE storage is specifically dedicated to translation ages, and instead a variable number of translation ages are embedded as arguments to a respective variable number of embedded Check Age micro-operations, advantageously freeing up TCE storage space for other uses.

In some embodiments, processing associated with Check Age micro-operations is selectively omitted. A recentness property is associated with a TCE, and is set after a TCE is accessed when all Check Age micro-operations associated with the TCE are processed without failure (i.e. all of the translation and current age comparisons are equal indicating that the TCE is not stale). A TCE is created with a recentness property that is clear. All of the recentness properties associated with all of the TCEs are cleared when any event occurs that potentially causes subsequently processed Check Age micro-operations to detect a difference between a translation age and a current age. Thus a recentness property of a TCE is set only when correct operation would result even if the Check Age micro-operations of the TCE were not processed (i.e. it is safe to omit checking for staleness of the TCE). Hence processing of Check Age micro-operations from a TCE associated with a set recentness property is advantageously omitted.

For example, when flow proceeds via "Yes" 405y, the recentness property associated with the TCE accessed in "Access TCE" 402 is set. If there are no recentness property clearing events before the TCE is accessed again, then subsequent processing in "Compare Translation Ages" 404 determines that all Check Age micro-operations of the TCE need not be processed (i.e. it is guaranteed that the TCE is not stale).

In some embodiments embodying a per-set or a per-way current age table (e.g. Current Age Table 115A of FIG. 3A or Current Age Table 115B of FIG. 3B), the recentness property clearing events comprise any combination of dirtying a cache line, evicting a cache line, modifying an entry in a TLB, evicting an entry in a TLB, and other similar events. In some embodiments embodying a region table age table (e.g. Current Age Table 115C of FIG. 3C), the recentness property clearing events comprise any combination of modifying a CATE (e.g. incrementing a current age), evicting a CATE, modifying an entry in a TLB, evicting an entry in a TLB, and other similar events.

In some embodiments, the recentness property is embodied as a recentness bit associated with or stored in a TCE (e.g. R 210 of FIG. 2).

According to various embodiments, processing associated with any combination of 402 and 404-408 is controlled or performed at least partially by Trace Cache Control 114 (of FIG. 1). According to various embodiments, processing associated with 403 is performed at least partially by any combination of Core1 111 and Core2 112 (of FIG. 1).

Figure 5:
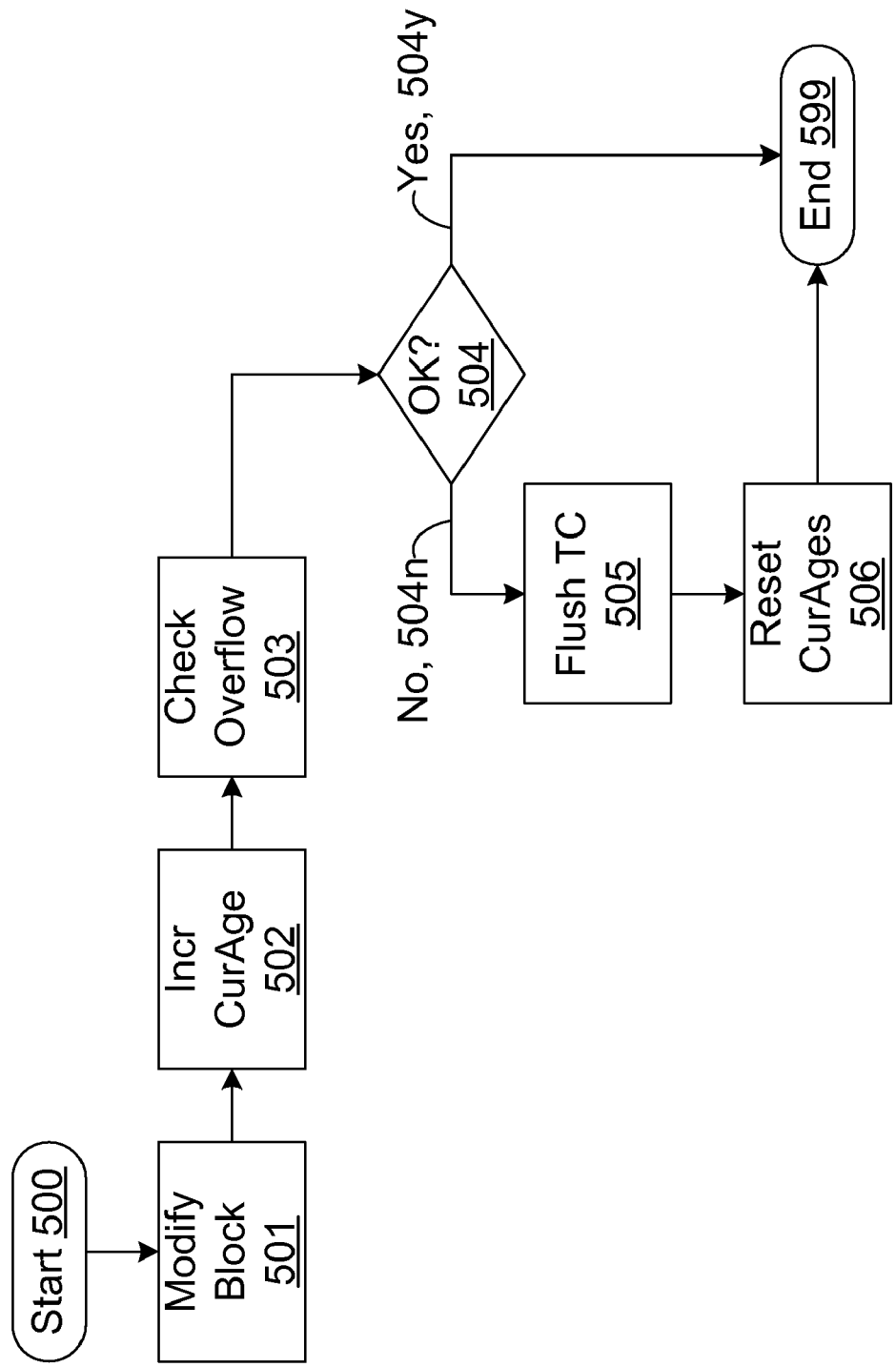
FIG. 5 illustrates selected details of processing relating to tracking current memory block ages in response to modifications to memory blocks in accordance with one embodiment of the present invention.

FIG. 5 illustrates selected details of an embodiment of processing relating to tracking current memory block ages in response to modifications to memory blocks. The modifications are due to any combination of a processor write and a device write, according to various usage scenarios. Flow begins ("Start" 501) and then a memory block is modified ("Modify Block" 501). Then the current age corresponding to the modified memory block is incremented ("Incr CurAge" 502), and flow continues to check if the incremented current age has overflowed ("Check Overflow" 503). The result of the check is examined ("OK?" 504), and if the check is okay ("Yes" 504y), then processing is finished ("End" 599). If the result of the check is not okay ("No" 504n), then there has been an overflow and translation age to current age comparisons are no longer valid. In response the entire trace cache is flushed ("Flush TC" 505) and all memory block current ages are reset to a minimum value, e.g. zero ("Reset CurAges" 506). Processing is then finished ("End" 599).

According to various embodiments, processing associated with any combination of 502-506 is controlled or performed at least partially by Trace Cache Control 114 (of FIG. 1). In some embodiments, processing associated with 501 is performed at least partially by any combination of Core 111 and Core2 112 (of FIG. 1).

Ignore-Write Flow

Figure 6:
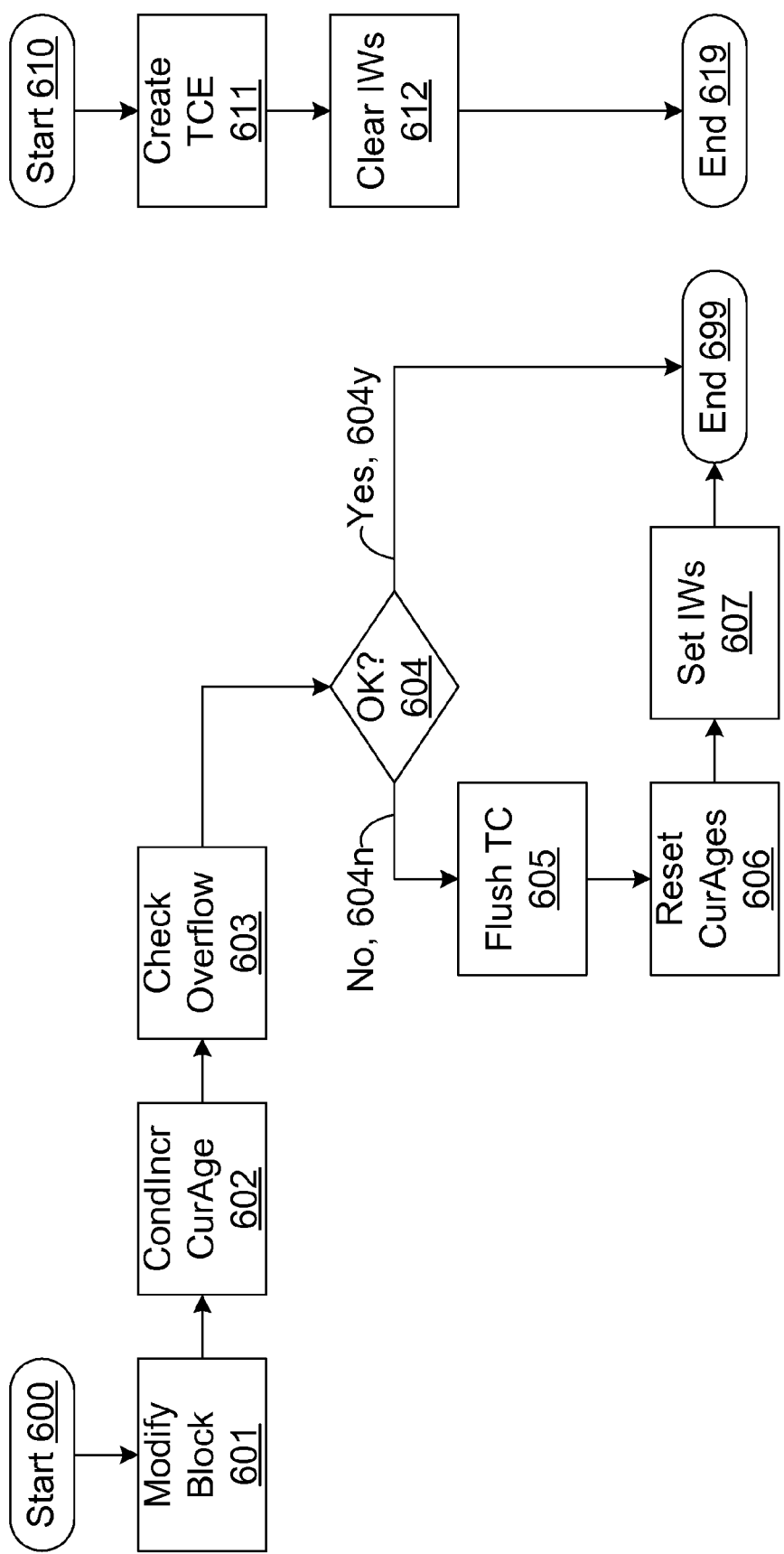
FIG. 6 illustrates selected details of processing associated with an ignore-write property of a memory block in conjunction with tracking memory block ages in response to modifications to memory blocks in accordance with one embodiment of the present invention.

FIG. 6 illustrates selected details of an embodiment of processing associated with an ignore-write property of a memory block in conjunction with tracking memory block ages in response to modifications to memory blocks. Two flows are illustrated, each with respect to a different event. The flow starting from "Start" 600 and finishing with "End" 699 is with respect to modification of a memory block. The flow starting from "Start" 610 and finishing with "End" 619 is with respect to creation of a TCE.

With respect to modification of a memory block (due to a processor or a device write, according to various usage scenarios), flow begins ("Start" 600) and then a memory block is modified ("Modify Block" 601). The current age corresponding to the modified memory block is then conditionally incremented ("CondIncr CurAge" 602). The increment is performed if an ignore-write property corresponding to the modified memory block is clear, and otherwise the increment is not performed. Thus the modification to the memory block is ignored if the ignore-write property corresponding to the memory block is set. Flow then continues to check if the conditionally incremented current age has overflowed ("Check Overflow" 603). The result of the check is examined ("OK?" 604), and if the check is okay ("Yes" 604y), then processing is finished ("End" 699). If the result of the check is not okay ("No" 604n), then there has been an overflow and translation age to current age comparisons are no longer valid. In response the entire trace cache is flushed ("Flush TC" 605), all memory block current ages are reset to a minimum value, e.g. zero ("Reset CurAges" 606), and all memory block ignore-write properties are set ("Set IWs" 607). Processing is then finished ("End" 699).

With respect to creation of a TCE, flow begins ("Start" 610) and then a TCE is created ("Create TCE" 611). Flow then continues to clear all ignore-write properties associated with all memory blocks underlying the created TCE ("Clear IWs" 612). Processing is then finished ("End" 619). Since ignore-write properties are cleared when a TCE is created, and set when all TCEs in the trace cache are invalidated (e.g. via a flush of the trace cache), only ignore-write properties of memory blocks that are underlying one or more (non-stale) TCEs are clear (and thus the remainder of the ignore-write properties are set). Therefore an ignore-write property that is set indicates when a modification to a memory block associated with the set ignore-write property is ignorable. In other words, no increment of the current age associated with the memory block is performed as there are no TCEs built from the memory block that are to be monitored for staleness. Reducing frequency of incrementing of memory block current ages reduces frequency of trace cache flushes due to memory block current age overflows in some usage scenarios, and thus advantageously enables some TCEs to remain in the trace cache longer.

According to various embodiments, processing associated with any combination of 602-607 and 611-612 is controlled or performed at least partially by Trace Cache Control 114 (of FIG. 1). In some embodiments, processing associated with 601 is performed at least partially by any combination of Core1 111 and Core2 112 (of FIG. 1).

Use-Count Flow

Figure 7:
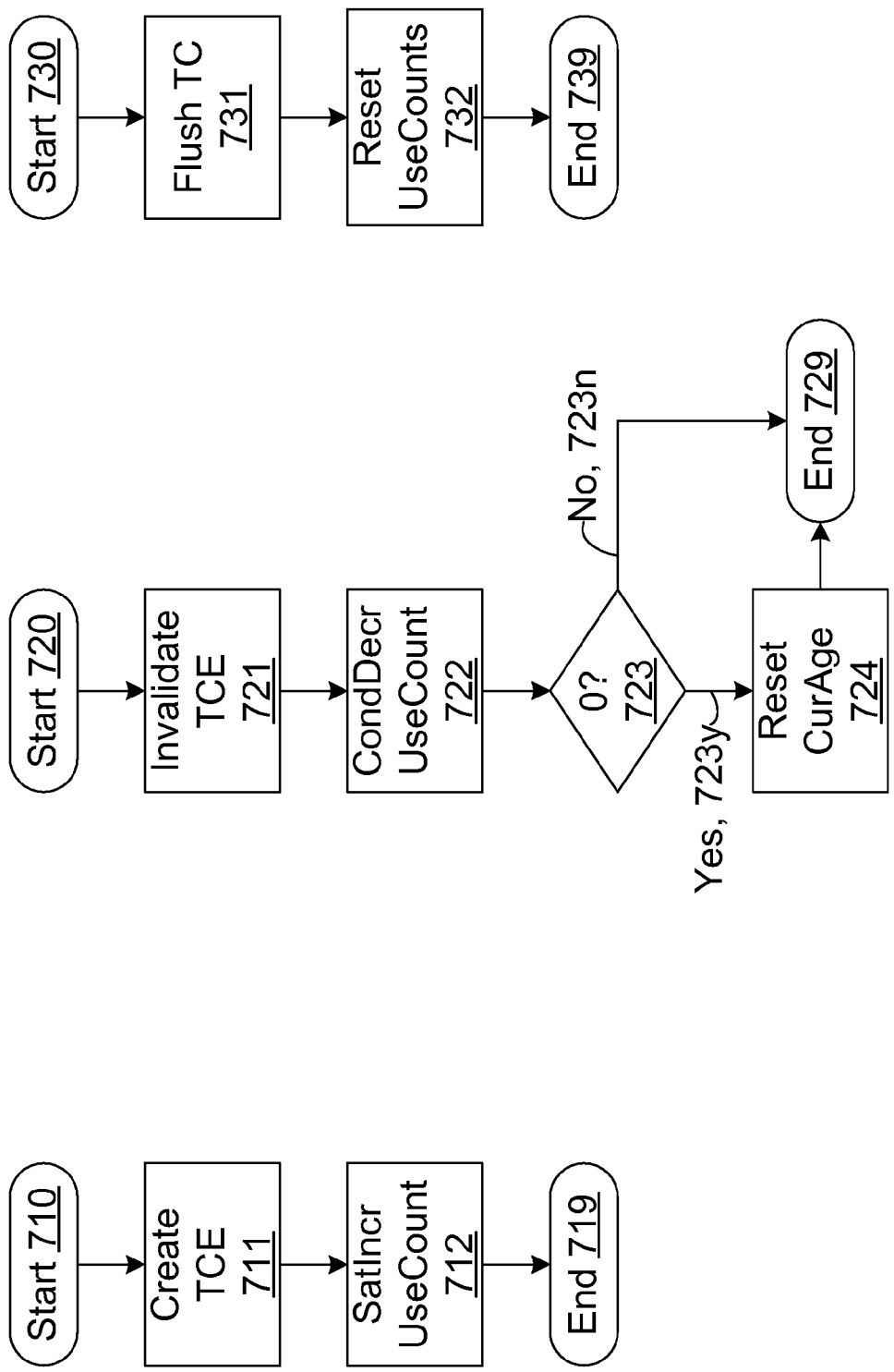
FIG. 7 illustrates selected details of processing associated with a use-count property of a memory block in accordance with one embodiment of the present invention.

FIG. 7 illustrates selected details of an embodiment of processing associated with a use-count property of a memory block. Three flows are illustrated, each with respect to a different event. The flow starting from "Start" 710 and finishing with "End" 719 is with respect to creation of a TCE. The flow starting from "Start" 720 and finishing with "End" 729 is with respect to invalidation of a TCE. The flow starting from "Start" 730 and finishing with "End" 739 is with respect to flushing a trace cache.

With respect to creation of a TCE, flow begins ("Start" 710) and then a TCE is created ("Create TCE" 711). Then for each memory block underlying the TCE the respective use-count property associated with the respective memory block is incremented with saturation at a maximum value ("SatIncr UseCount" 712). Processing is then finished ("End" 719). Processing relating to updating a TCE is similar, except that only use-count properties associated with "new" memory blocks underlying the updated TCE (i.e. memory blocks that were not underlying the TCE before the updating) are incremented (with saturation).

With respect to invalidation of a TCE, flow begins ("Start" 720) and then a TCE is invalidated ("Invalidate TCE" 721). Then for each memory block underlying the TCE the respective use-count property associated with the respective memory block is conditionally decremented. The conditional decrement results in the use-count property being decremented by one if the use-count property was not previously at the maximum value. The conditional decrement results in no change if the use-count was previously at the maximum value. Flow then continues to determine of the use-count property has been decremented to zero ("0?" 723). If so ("Yes" 723y), then the current age of the memory block associated with the use-count property is reset to zero ("Reset CurAge" 724) and processing is then finished ("End" 729). If not ("No" 723n), then processing is finished ("End" 729). In some usage scenarios activation of path "Yes" 723y increases time between overflows of a memory block current age, thus enabling longer periods between trace cache flushes due to current age overflows, and hence advantageously enabling some TCEs to remain in the trace cache longer.

With respect to flushing a trace cache, flow begins ("Start" 730) and then the trace cache is flushed ("Flush TC" 731). Flow then continues to reset to zero all use-count properties associated with all memory blocks ("Reset UseCounts" 732). Processing is then finished ("End" 739).

According to various embodiments, processing associated with any combination of 711-712, 721-724, and 731-732 is controlled or performed at least partially by Trace Cache Control 114 (of FIG. 1).

Block Table

The per-set current age table is an example of a block table. The per-way current age table is a further example of a block table. Size, organization, and management of a block table varies according to various embodiments. In some embodiments, a memory block is a full page in size and the block table is managed as a subset of an instruction TLB, resulting in relatively more invalidations than in some embodiments with smaller block sizes. In some embodiments having relatively larger memory block sizes (such as embodiments with full or half-page sized memory blocks), relatively more space is allocated to TCE use-count information than in some embodiments with relatively smaller memory block sizes. For example, Use-Count 312 (of FIG. 3A) is a relatively wider field in some embodiments for full-page sized memory blocks compared to some embodiments with half-cache line sized memory blocks, thus reducing saturations in some usage scenarios.

In some embodiments where the memory block size is a multiple of an instruction page size, a block table is managed to correspond to a subset of page translations provided by an instruction TLB. In some embodiments where the memory block size is a multiple of an instruction page size, the instruction TLB is snooped to determine when a write to a respective block of memory occurs (and hence when to increment the corresponding current age information in the block table).

In some embodiments the memory block size is a multiple of a Level 2 cache line size, and a trace cache is managed to correspond to a subset of the Level 2 cache. In some embodiments when micro-operations from the trace cache are processed, the instructions corresponding to the micro-operations are still in the Level 2 cache.

In some embodiments a block table is an extension (logical, physical, or both) of one or more Level 2 cache data structures, and the trace cache is managed to correspond to a subset of the Level 2 cache. Detection of self-modifying code events comprises using CAMs (for example via physical address comparison) in the Level 2 cache to detect modifications or evictions. When a Level 2 cache line is modified or evicted, a current age corresponding to the modified or evicted cache line is incremented in the block table.

In some embodiments, a cache comprises all or portions of a block table. For example, in some embodiments a level 1 instruction cache comprises any combination of current age, ignore write, and use-count information for each set of the level 1 instruction cache. For another example, in some embodiments a level 2 cache (such as L2$ 113 of FIG. 1) comprises any combination of current age, ignore write, and use-count information for each set of the level 2 cache. In some embodiments, a cache of a processor is implemented in part by an array, and block table information is stored in an extension portion of the array.

In some embodiments, the block table storage requirements are reduced with respect to other embodiments. For example, any combination of current age, ignore-write, and use-count memory block tracking information is stored on a per level 2 cache line basis, or to reduce storage, at least two level 2 cache lines are tracked by the same shared information. More specifically, if the level 2 cache is 4-way associative, then tracking information is stored for each group of four cache lines corresponding to the four ways. For another example, the information is stored on a per level 2 cache row basis, or to reduce storage, at least two level 2 cache rows (such as four or eight rows) are tracked by the same shared information. In some embodiments, storage of shared information is via one or more extensions of level 2 cache data structures.

Incrementing and Decrementing

In various embodiments, incrementing/decrementing (e.g. current ages or use-count properties of memory blocks) is in accordance with a signed or an unsigned two's complement numbering system. In various embodiments, the incrementing/decrementing is in accordance with a grey-code numbering system. In various embodiments, the incrementing/decrementing is in accordance with an arbitrary sequence of unique states, beginning with an initial (or starting) value associated with a beginning state, and ending with a final (or maximum) value associated with an ending state. In some of the embodiments having an arbitrary sequence of unique states, incrementing corresponds to advancing toward the ending state, associated with the final (or maximum value), and overflow corresponds to attempting to advance beyond the ending state. In some of the embodiments having an arbitrary sequence of unique states, decrementing corresponds to advancing toward the beginning state, associated with the initial (or starting value).

CONCLUSION

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements is variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards; memory and cache size and organization; trace cache size and organization; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

The invention claimed is:

1. A system comprising:
a processor core enabled to execute micro-operations;
a trace cache enabled to hold trace cache entries, each comprising one or more sampled ages and one or more micro-operations; and
a control element enabled to:
formulate one of the trace cache entries to correspond with one or more instructions, wherein each instruction corresponds to one or more memory blocks and each memory block has a current age;
determine the current ages of the memory blocks that correspond with a particular trace cache entry;
compare the sampled ages of the particular trace cache entry with the determined current ages; and
selectively invalidate the particular trace cache entry based on a result of the compare.

2. The system of claim 1, wherein the control element is further enabled to advance the current age of a particular memory block in response to the processor core executing a micro-operation that writes to the particular memory block.

3. The system of claim 2, wherein the control element is further enabled to detect when the current age of the particular memory block advances to a maximum value, and in response to flush the trace cache.

4. The system of claim 2, wherein the control element is further enabled to detect when the current age of the particular memory block advances to a maximum value, and in response to reset the current age of the particular memory block to a starting value.

5. The system of claim 2, wherein each memory block further has an ignore write property and the control element is further enabled to perform the advance conditionally dependent upon the value of the ignore write property of the particular memory block.

6. The system of claim 1, wherein each memory block further has an ignore-write property and the control element is further enabled to set the ignore-write property of a particular memory block in association with the formulation of a trace cache entry from an instruction corresponding with the particular memory block.

7. The system of claim 1, wherein each memory block further has an ignore-write property and the control element is further enabled to clear the ignore-write property of every one of the memory blocks in association with flushing the trace cache.

8. The system of claim 1, wherein the control element is further adapted to perform the compare for the particular trace cache entry in association with the processor core accessing the particular trace cache entry.

9. The system of claim 1, further comprising a storage array enabled to hold the current ages of at least a portion of the memory blocks.

10. The system of claim 9, further comprising:
a cache adapted for use with the processor core and enabled to hold at least a portion of the instructions;
wherein the control element is further enabled to access the storage array in the same manner as the cache is accessed.

11. The system of claim 1, wherein the control element is further enabled to receive notification when the processor core executes micro-operations that write to memory.

12. The system of claim 1, wherein each trace cache entry further comprises one or more memory block identifiers, and the determination of the current ages of the memory blocks that correspond with the particular trace cache entry uses the memory block identifiers.

13. The system of claim 1, wherein each memory block further has a use-count, and the control element is further enabled to detect when the use-count of a specific memory block is set to a starting use-count value, and in response to set the current age of the specific memory block to a starting current age value.

14. The system of claim 1, wherein each memory block further has a use-count, and the control element is further enabled to detect when the trace cache is flushed, and in response to set the current age of every one of the memory blocks to a starting current age value.

15. The system of claim 1, wherein each memory block further has a use-count, and the control element is further enabled to advance in a first direction the use-count of a specific memory block as part of the formulation of the trace cache entry that corresponds with one or more instructions that correspond with the specific memory block.

16. The system of claim 15, wherein the control element is further enabled to advance in a second direction the use-count of a second specific memory block as part of the selective invalidation of the second specific memory block.

17. The system of claim 1, wherein each memory block further has a use-count, and the control element is further enabled to set the use-count of every one of the memory blocks to a starting value in association with flushing the trace cache.

18. A method comprising:
creating an entry in a trace cache based at least in part on one or more of a plurality of memory blocks;
associated with the creating, sampling one or more current ages of a plurality of current ages;
managing a correspondence between each of the current ages and a respective one of the memory blocks;
detecting a modification to any one of the one or more memory blocks; and
subsequent to the detecting, selectively invalidating the entry.

19. The method of claim 18, further comprising in response to the detecting, advancing the current ages corresponded to by the one or more memory blocks.

20. The method of claim 19, further comprising subsequent to the advancing and prior to the selectively invalidating, comparing the current ages corresponded to by the one or more memory blocks with results of the sampling.

21. The method of claim 19, further comprising omitting the advancing if an ignore-write property associated with the one or more memory blocks is in a first state, and setting the ignore-write property to a second state in association with the creating.

22. The method of claim 21, further comprising setting the ignore-write property to the first state in response to flushing the trace cache.

23. The method of claim 18, further comprising resetting the current ages in response to flushing the trace cache.

24. A system comprising:
means for creating an entry in a trace cache based at least in part on a translation of one or more instructions obtained from one or more of a plurality of memory blocks;

means for sampling current ages of the one or more memory blocks in coordination with the means for creating; and means for selectively invalidating the entry after speculatively executing at least a portion of results of the translation if any portion of the one more memory blocks has been modified after creation of the entry and before the speculatively executing.

25. The system of claim 24, further comprising a means for advancing the current ages in response to modifications of any portion of the memory blocks and in accordance with a maximum current age.

26. The system of claim 25, further comprising a means for flushing the trace cache in response to an overflow of any the current ages.

* * * * *